Aug. 18, 1959  F. D. STOTT  2,899,858
ABSORPTIOMETERS
Filed Oct. 22, 1956  3 Sheets-Sheet 1

INVENTOR
FRANK DUDLEY STOTT

BY
Stevens, Davis, Miller & Mosher
ATTORNEYS

Aug. 18, 1959   F. D. STOTT   2,899,858
ABSORPTIOMETERS
Filed Oct. 22, 1956                           3 Sheets-Sheet 3

INVENTOR
FRANK DUDLEY STOTT
BY
Stevens, Davis, Miller + Mosher
ATTORNEYS

United States Patent Office 2,899,858
Patented Aug. 18, 1959

2,899,858

ABSORPTIOMETERS

Frank Dudley Stott, Askett, near Princes Risborough, England, assignor to National Research Development Corporation, London, England, a corporation of Great Britain Application October 22, 1956, Serial No. 617,458

Claims priority, application Great Britain November 4, 1955

10 Claims. (Cl. 88—14)

This invention relates to absorptiometers and like apparatus for the measurement of the degree of light absorption by a liquid, over any desired frequency band, or the comparison of such absorption by an unknown sample of liquid with that by a known sample. The frequency band over which absorption is to be measured is not necessarily confined to the visible range of the spectrum.

It is an object of the invention to provide an improved construction of absorptiometer having a high degree of sensitivity and in which linearity of the relationship between optical density and concentration of a liquid is unimportant. Another object is to provide an absorptiometer which is capable of determining, to a high degree of accuracy, the total amount of a solute in an unknown solution by determining the end point of reaction in a solution, which end point is characterised by a change in either colour or absorption.

According to the present invention, an absorptiometer comprises a pair of upright open-mouthed liquid-tight vessels each shaped so that the depth of liquid therein is always proportional to the volume, and having at least its bottom wall of transparent material, means for directing vertical light beams of equal intensity one through each vessel onto respective photo-sensitive detectors, means for controlling the amount of light directed through one of the vessels, and means for comparing the outputs of the photo-sensitive detectors.

Such an instrument can readily be adjusted to give the same light absorption by each vessel when the same liquid is in each, so that it is self-compensating for inequalities of nominally matched components in the optical systems. Hence it is not necessary to ensure exact equality between the initial lengths of path of the two light beams through the liquid, as is normally the case with absorption cells, nor need the lengths of these liquid paths be held to a fixed ratio once the instrument has been balanced, since any disturbance of the light absorption by the liquid in either vessel is compensated for by readjustment of the other optical circuit to restore the initial balance of the photocell outputs. The amount of each such readjustment provides a measure of the disturbance. The instrument is, therefore, independent of linearity between optical density and concentration of the liquid.

Furthermore, since the length of the light path through the liquid in either vessel is proportional to the volume of the liquid, changes in optical density of the liquid due to chemical dilution or concentration will not affect the total absorption. Hence an instrument according to the invention can be used to estimate the quantity of a substance in a given volume of an unknown solution by titrating preferably the same initial volume of solvent with a known solution of the substance until the end point is indicated by restoration of the initial null balance of the photocell outputs. Highly accurate quantitative estimations are thus possible, and an instrument according to the present invention could be used with advantage, for example, in the analysis of impurities in metals or industrial chemicals.

Preferably an absorptiometer according to the present invention includes, in addition to the above components, means for introducing measured quantities of liquid into the appropriate one of the vessels during the passage of the light beams therethrough.

In order to sharpen the response of the apparatus, particularly where either the known or the unknown liquid—or both—has a wavelength absorption characteristic which exhibits a peak or trough at a particular frequency or frequency band, a filter is preferably interposed in each light beam to block all frequencies on one side or the other of this peak or trough.

A practical embodiment of the invention will now be particularly described, by way of illustration only thereof, with reference to the accompanying drawings in which.

Figure 1:
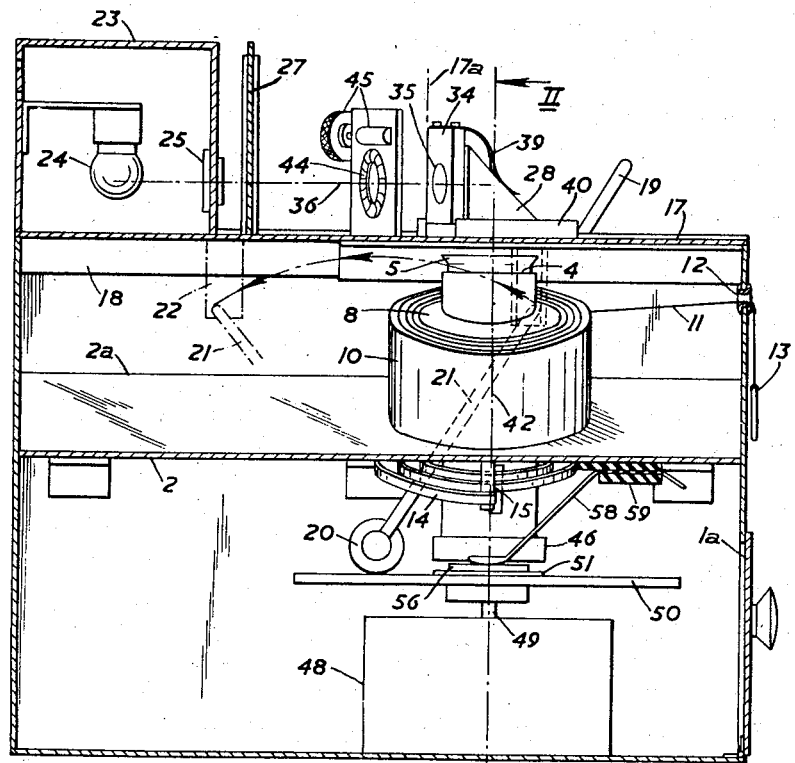
Figure 1 is a sectional elevation on the line I—I of Figure 2.
Figure 4:
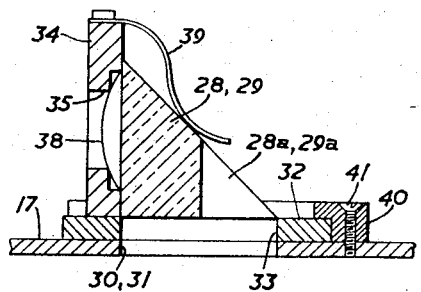
Figure 4 is a sectional elevation of a prism and its mounting.
Figure 2:
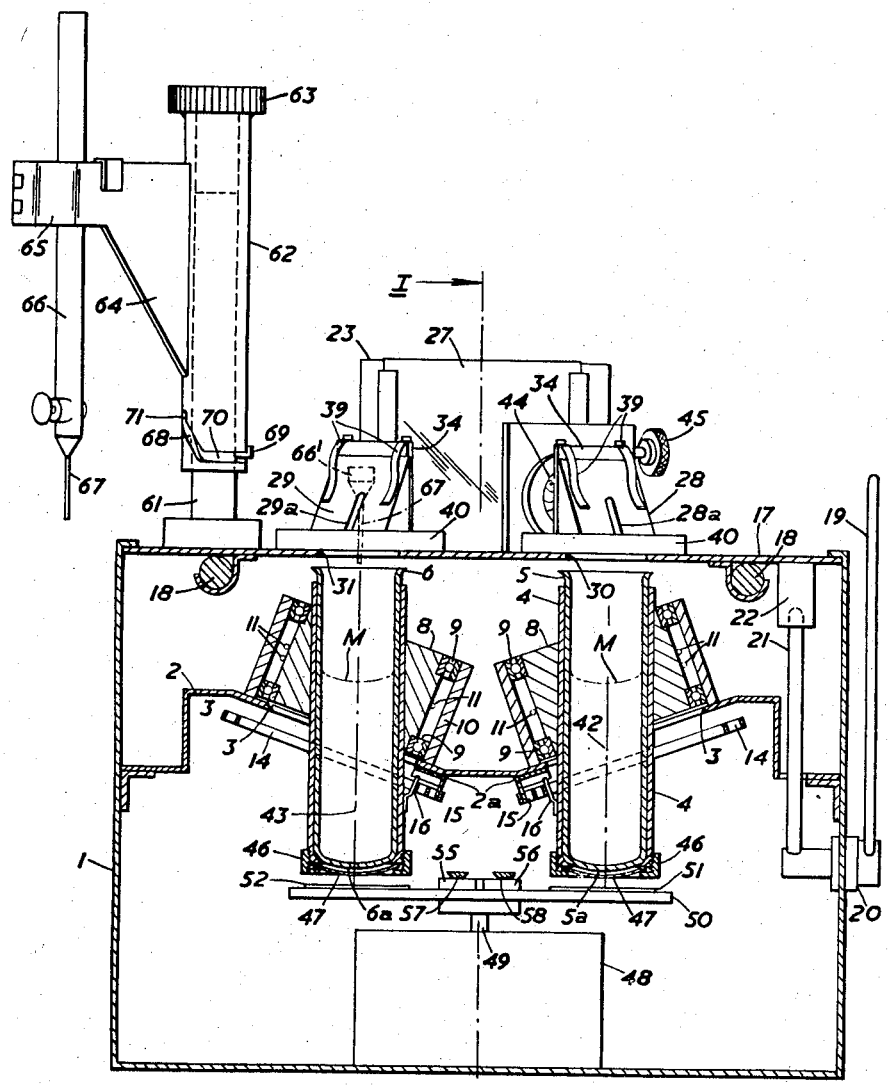
Figure 2 is a sectional elevation on the line II—II of Figure 1.

Referring first to Figures 1–4, a casing 1 has an internal, generally horizontal, partition 2 of a shallow trough shape in transverse cross-section, as shown in Figure 2. The sides 2a of the trough are inclined at an angle of about 20° to the horizontal, and towards the front end are apertured at 3 (Figure 2) to pass a pair of normally vertical tubular holders 4 whose lower ends have inturned lips to support tubular glass or like transparent vessels or cells 5, 6, such as test tubes, whose respective bases 5a, 6a are dished to the same shape as the normal meniscus M (Figure 2) formed by an aqueous solution or other liquid therein. Each tubular holder 4 is held in a respective cylindrical bush 8 whose axis lies normal to the plane of the respective side 2a of the trough and is supported in ball bearings 9 (Figure 2) held in a cylindrical housing 10 secured to the partition 2.

A cord 11 is wound around each bush 8 and anchored thereto at one end, the free end of the cord passing through an eyelet 12 in the front wall of the casing 1 and carrying a ring 13 which hangs in front of this front wall. A spiral clock spring 14, coaxial with the bush 8, is anchored at one end to a bracket 15 welded to the underneath of the trough side 2a and at the other to a lug 16 welded to the tubular holder 4, the lug 16 being adapted to engage a part of the bracket 15 and be held in engagement therewith by the clock spring 14 when the tubular holder 4 is vertical. When the cord 11 is pulled, the bush 8 rotates causing the respective cell 5 or 6 to perform a quasi-precessional motion by describing a conical surface in space, at the same time winding up the spring 14. When the cord is released, the spring returns the bush 8 to the position where the holder 4 is vertical and the lug 16 is in contact with the bracket 15. The above motion of the cell 5 or 6 promotes efficient agitation of the solution which is particularly desirable in the vicinity of the end-point of a titration.

The top of the casing 1 is closed by a sliding panel or top plate 17 which rests on two parallel rods 18 carried by the front and back walls of the casing. The movement of the top plate is controlled by a lever 19 journalled in a bush 20 in one side wall of the casing. An arm 21 within the casing is locked to the lever 19 and extends upwards to engage at its free end between a pair of lugs 22 on the underside of the plate 17. The latter can be moved from the fully closed position shown in Figure 1 to an open position in which its front edge is approximately in the position indicated by the dotted line 17a in Figure 3 and the chain line 17a in Figure 1. This travel of the top plate 17 is sufficient to permit easy access to the cells 5, 6, in the open position of the top.

The top plate 17 carries a housing 23 for a light source 24 and having two front windows 25, 26. A light filter 27 is placed in front of the windows 25, 26 the colour of this filter being selected according to the wavelength absorption characteristic of the liquid in either cell 5, 6. A 45° prism 28, 29 is mounted over a respective hole 30, 31 (Figure 2) in the top plate 17, each hole being coaxial with the corresponding cell 5, 6. The mounting for each prism 28, 29 consists of a circular base plate 32 (see Figure 4) having a central aperture 33 to register with the respective hole 30, 31 in the top plate 17. To this base plate 32 is brazed or otherwise secured a vertical rectangular block 34 having an aperture 35 aligned with the corresponding axis 36, 37 (Figure 3) through a respective window 25, 26 and the light source 24. A plano-convex lens 38 is located in this aperture 35 with its plane face plush with the rearward face of the block 34, against which the prism 28 or 29 is held by a pair of leaf springs 39 anchored to the top edge of the block. The circular base plate 32 is located in a recess on the underside of a part-annular retainer 40 which is screwed at 41 (Figures 3 and 4) to the top plate 17.

The axes 36, 37 represent two divergent light beams from the light source 24 which are focused by the respective lenses 38 and reflected by the associated prisms 28, 29 through 90° to pass down the axis 42 or 43 of the respective cell 5, 6, as shown in Figure 1. In the beam 36 is located an adjustable iris diaphragm 44 (Figures 1–3) with conventional aperture adjustment indicated at 45. This diaphragm 44 could, if preferred, be located in the beam 37.

Figure 5:
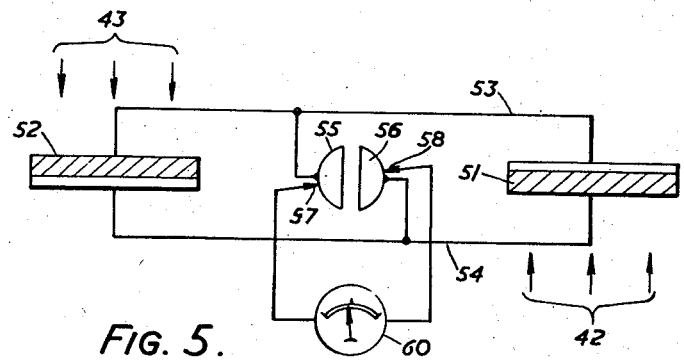
Figure 5 is a schematic circuit diagram of the photocell arrangement.

To the lower end of each holder 4 is attached, as by a threaded ring 46, a diffusion screen 47. In the base of the casing 1 is located a motor 48 whose shaft 49 carries a horizontal disc 50 situated closely below the diffusion screens 47. At opposite ends of a diameter of this disc 50 are fixed a pair of barrier layer photocells 51, 52 which are electrically connected in series (see Fig. 5) by conductors 53, 54. Each conductor is electrically connected to one half 55, 56, respectively, of a commutator fixed centrally on the disc 50. A pair of fixed brushes 57, 58 are mounted on an insulator 59 (Figure 1) secured to the underside of the partition 2. As shown schematically in Figure 5, these brushes are connected—preferably through an amplifier—to a sensitive galvanometer 60, which may be a centre-zero microammeter. If both beams reflected from the prisms 28, 29 along the cell axes 42, 43 are of equal intensity when they emerge from the diffusion screens 47, there will be no potential difference across the commutator 55, 56, and the galvanometer 60 will not deflect. This is the condition which indicates the end-point of a titration of a known solution in one cell 5 or 6 against an unknown solution in the other cell 6 or 5.

For ease of maintenance, the motor 48 and photocell disc 50, complete with photocells 51, 52 and commutator 55, 56, is removable from the casing 1 through an access door 1a.

To enable the absorptiometer to be used for titration methods, a pillar 61 (Figures 2 and 3) is secured to the top plate 17 near one prism—in the drawings, this is shown as the prism 29—and carries a sleeve 62 which can both rotate and slide on the pillar. The sleeve terminates at its upper end in a knob 63, and carries a lateral bracket 64 at whose outer end is a conventional form of burette clamp 65. A burette 66 is held in this clamp, its lower end terminating in a fine nozzle such as a polythene needle or steel hypodermic needle 67. The parts are arranged so that the burette 66 can be swung around the pillar 61 to and from a position in which the needle 67 is coaxial with the axis 43 of the adjacent cell 5.

In order that the needle 67 may occupy this position of coaxiality, the prism 29 is slotted at 29a, the dimensions of this slot being kept to the minimum to allow just enough clearance for the needle 67. As shown in the drawings, the prism 28 is also slotted at 28a so that the prisms are interchangeable and have closely similar optical characteristics.

Figure 3:
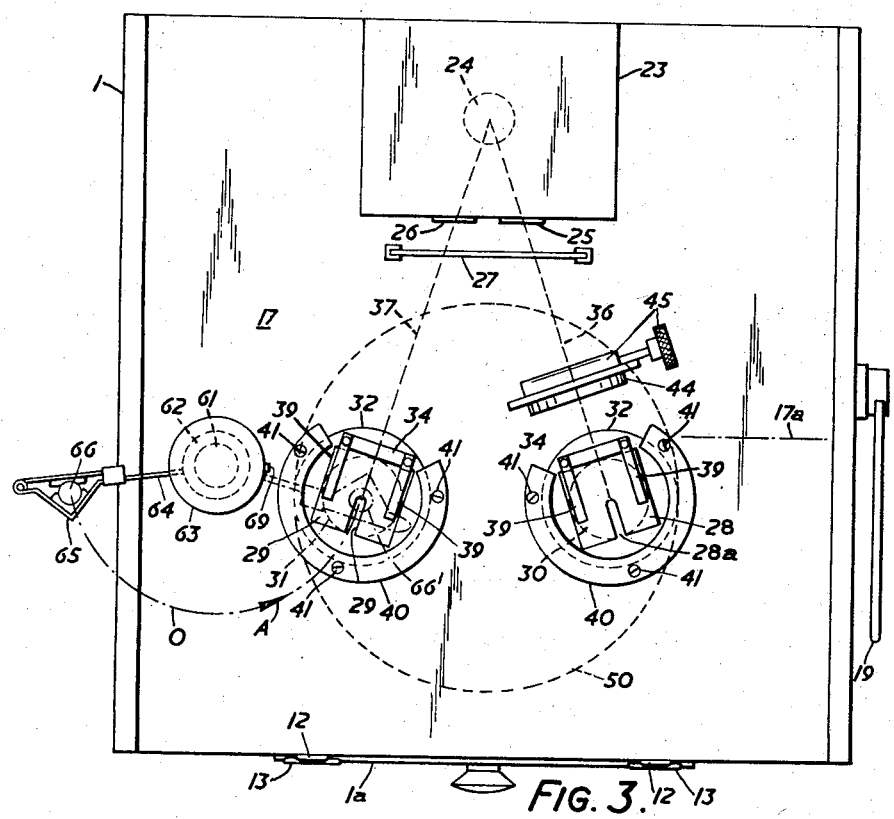
Figure 3 is a plan view.

Preferably, and as shown, the sleeve 62 has an oblique slot 68 formed through its wall adjacent the lower end in which is engaged a pin 69 projecting radially from the pillar 61, the slot 68 having a horizontal "tail" portion 70 of sufficient arcuate extent to allow the needle 67 to remain at a constant height clear of the retainer ring 40 during its angular travel, as indicated by the chain line 0 in Figure 3, from the inoperative position illustrated in full lines to the operative coaxial position above the cell 6, as shown by the dotted lines 66', 67' in Figures 2 and 3. During the final part of the swing of the burette 66 in the direction of the arrow A (Figure 3), the pin 69 engages the oblique slot portion 68 to allow the sleeve 62 to descend so that the needle passes down through the holes 33, 31 in the prism-supporting base plate 32 and the top plate 17.

The optical system, and particularly the lenses 38, is so arranged that before the cells 5, 6 are placed in their holders 4, the beams 36—42 and 37—43 are brought to a focus at the diffusers 47, whilst the meniscus M formed by an aqueous solution in each cell 5, 6 renders the appropriate beam 42, 43 substantially parallel.

In operation, equal quantities of the same transparent carrier or solvent are introduced into the cells 5, 6, the motor 48 is started, and the iris diaphragm 44 is adjusted at 45 until the outputs of the photocells 51, 52 are equal, as shown by zero deflection of the galvanometer 60. The unknown substance is then introduced into the cell 5 whilst a known standard solution is added to the cell 6 from the burette 66. As soon as the unknown substance is introduced into the cell 5, the optical balance of the system is disturbed and the outputs of the photocells 51, 52 become unequal. A potential difference thus appears across the commutator 55, 56, causing a unidirectional current to flow in the galvanometer 60 and cause a deflection thereof. When sufficient standard solution has been added to the cell 6 to restore equality of light absorption by the liquids in the two cells 5, 6, the outputs of the photocells 51, 52 again equalise, and the end-point of the titration is observed as zero deflection, the apparatus thus operating on the null balance principle. In a magnesium content estimation according to one method in which it is reacted with the dye Eriochrome black in alkaline solution, the cells initially contain equal quantities of dye and buffer, for which the initial optical adjustment is made for balance. The unknown is then added to cell 5, and titration continues in cell 6 until balance is restored. An accuracy of 1% in concentrations of one part in $10^6$ has been obtained.

The photocells 51, 52 could, if desired, remain stationary, but it is preferred to adopt the rotary mounting shown so as to eliminate errors due to any inequalities of their response. The commutator 55, 56 ensures that the current fed to the galanometer is unidirectional so long as the same beam 42 or 43 is the brighter. When the relative beam intensities are reversed, the direction of the current reverses.

Since the light beam 42, 43 traverse the cells 5, 6 axially, and the bottom surface 5a, 6a of each cell is curved to conform to the meniscus M, the addition of water or othere transparent solvent to a cell containing a dye solution or other optically absorbing liquid, does not cause any change in the transmission. The shape of the bottom 5a, 6a of each cell is important; if it is incorrect, the depth of solution is no longer strictly proportional to the volume, so that the product of optical path and concentration will no longer be constant, and the transmission will change as the dye is diluted. On testing with copper sulphate in acid solution in a practical embodiment of the invention, the transmission change did not exceed 0.1% over a volume range 2–7 ml. (i.e. a density change of 0.0005). It is equally important that the cells 5, 6 should be strictly parallel over the whole of the working length; a tolerance limit of 0.0005" on the diameter is desirable.

To obtain the best sensitivity and accuracy, some care is required in determining the proper working conditions. The optical density of the sample should be between 0.3 and 1.0—preferably about 0.5. Under these conditions, the probable error in determining the end point should not exceed 0.001 density units, and with care will be only about 0.0005. This means that quite accurate results, having a probable error of not more than 1% or 2%, can be obtained even when the total change in optical density due to the addition of the sample is only 0.05. Where the highest possible accuracy is required, and the conditions are such as to justify it, the "drop" error of the burette 66 can be eliminated by taking two or three readings of the galvanometer 60 and the burette 66 near the end point as the drops are added and interpolating for the exact point of balance. The galvanometer deflection is linearly related to the burette reading over a considerable range in the neighborhood of the balance point.

Since the contents of the two cells are identical apart from some difference in the quantity of water or other solvent at the end point, it is not necessary with this instrument that there should be a linear relationship between concentration of the substance to be estimated and the optical density. It is therefore permissible to use filters or combinations of filters transmitting light over quite a wide range of wavelengths. This greatly contributes to the high sensitivity which can be achieved with a very simple photoelectric detecting circuit 51 . . . 60. It is also immaterial whether the density is increased or decreased by the addition of the sample.

In a modified construction (not shown), the burette 66 is mounted for simple sliding on the pillar 61 without angular displacement. The balance indicator instrument 60 may also operate a feed-back loop for controlling the discharge of the burette, thus providing automatic titration. Since the apparatus operates on a null balance principle, it is particularly useful where coloured reagents or solvents are used.

The galvanometer 60 may, if desired, include the necessary amplifier—which can incorporate transisitors —or the amplifier may be housed in the casing 1. The latter is made light-proof so that the photocells 51, 52 are not affected by stray light, and the access door 1a may, if preferred, constitute the front wall of a slidable tray carrying the motor 48 and the amplifier when this is housed in the casing 1 to facilitate withdrawl of these components for routine attention.

I claim:

1. A titration absorptiometer having a pair of similar open-mouthed vessels with transparent bases and shaped so that the depth of a liquid therein is accurately proportioned to its volume; means for supporting each vessel with its axis normally vertical; an optical system for producing two steady light beams; a reflecting prism mounted vertically above the axis of one vessel at a constant height above the mouth thereof for directing one of the said steady light beams downwards along the axis of the said vessel, the said prism having a narrow vertical slot formed through a portion thereof to register with the mouth of the said vessel; a calibrated titrating liquid dispenser having a controllable discharge nozzle adapted to pass through the said slot; means located at a constant height above the mouth of the other vessel for directing the other of the said steady light beams downwards along the axis of the said other vessel; two photocells mounted below the vessels for irradiation by the respective downward focused light beams; and means for continuously comparing the outputs of the photocells while titrating liquid is being added to the said one vessel.

2. A titration absorptiometer according to claim 1 wherein the optical system is arranged so that the beam which traverses the full length of each vessel is substantially parallel during its passage through a liquid contained therein.

3. A titration absorptiometer comprising a lightproof casing; a pair of open-mouthed vessels located side by side within the casing, each vessel having at least its bottom wall of transparent material and being shaped so that the depth of liquid therein is proportional to its volume; a rotary holder for supporting each vessel in a normally vertical position and rotatable about an axis inclined to the vertical; a light source mounted on a horizontal top panel of the said casing; an optical system on said top panel for directing two divergent horizontal beams of light to intersect the vertical axes of the vessels at points above the mouths thereof; a reflecting prism located on the said horizontal panel at the point of intersection of one horizontal light beam and the vertical axis of the corresponding vessel for reflecting the horizontal beam downwards along the vessel axis; an adjustable obturator in the path of the said horizontal light beam; an apertured reflecting prism located at the point of intersection of the other horizontal light beam and the vertical axis of the other vessel, the aperture extending vertically downwards through part of the prism to register with the mouth of the said other vessel; means for introducing liquid into the said other vessel through said prism aperture; a pair of photocells located one beneath each vessel for irradiation by the respective light beams after passage through the full lengths of the vessels; and means for comparing the outputs of the two photocells as liquid is introduced into the said other vessel.

4. A titration absorptiometer comprising a lightproof casing having a horizontally slidable top panel and a generally horizontal fixed internal partition; a pair of similar upright cylindrical vessels having transparent bases and shaped so that the depth of liquid in each is proportional to the liquid volume; a holder for supporting each vessel with its mouth below the level of the top panel; a bearing for each holder mounted on the partition and having its axis of rotation inclined at a small angle to the vertical; coacting abutments on each holder and the partition defining the vertical position of the axis of each vessel; a spring biasing each holder abutment into contact with its respective coacting abutment on the partition; means passing through a wall of the casing for effecting rotation of each holder in its bearing; an aperture in the top panel of the casing adapted to register with the mouth of each vessel in the vertical position thereof; a reflecting prism adjustably mounted over each aperture for reflecting a horizontally incident light beam vertically downwards through the corresponding vessel; at least one of the said prisms having a vertical slot formed therein and opening through its base and its inclined reflecting surface and extending inwards from their meeting edge to approximately the line of the corresponding vessel axis; a bracket pivotally mounted about a vertical axis on the slidable top panel of the casing adjacent the said slotted prism and adapted to support a burette in such a way that its discharge nozzle can be introduced into the said slot; a steady light source mounted on said slidable panel; an optical system interposed between said light source and each vessel for producing a generally parallel light beam in each vessel when liquid is present therein; a pair of photocells mounted beneath the vessels for irradiation by the light beams emerging from the vessels in their normal vertical positions, and means for comparing the photocell outputs during introduction of a titration reagent from the burette into the one vessel.

5. A titration absorptiometer according to claim 4 wherein the top panel is slidable through a sufficient distance to provide access through the top panel of the casing for the insertion of the vessels into their holders, or their removal therefrom.

6. A titration absorptiometer for measuring the total content of a substance in a solution comprising a casing; a pair of vessels located side by side within the casing, each vessel having an open mouth and a bottom wall of transparent material shaped to the same contour as that of a body of liquid therein; a holder for supporting each vessel in a normally vertically position; a bearing carrying such holder and rotatable about an axis inclined to the vertical; means for oscillating said holder about said axis for agitating said body of liquid; a light source; an optical system located above and clear of the mouth of each vessel for directing a steady beam of light axially downwards through the full length of each vessel; means for introducing a reagent axially into one of the said vessels during passage of the steady light beam therethrough; a pair of photocells located beneath the vessels for irradiation by the said beams after passage through the vessels; and means for comparing the outputs of the two photocells during the introduction of the reagent.

7. An absorptiometer comprising a casing; a pair of open-mouthed cylindrical vessels located side by side within the casing, each vessel having its bottom wall of transparent material and shaped to the same contour as that of the meniscus of a body of liquid in the vessel; a holder for supporting each vessel in a normally vertical position; a bearing carrying said holder and rotatable about an axis inclined to the vertical; means for oscillating said holder about said axis for agitating said body of liquid; a light source; an optical system located above and clear of the mouth of each vessel for directing a beam of light vertically down through the full length of each vessel; means for introducing a titration reagent axially through the open mouth of one vessel during the passage of the respective light beam therethrough; means for controlling the relative intensities of the two beams; a pair of photocells; a common carrier for said photocells located beneath the said vessels; means for rotating the said carrier about an axis parallel to, and equidistant from, the vertical axes of the said cylindrical vessels so as to bring each photocell into register with each vessel alternately for irradiation by each beam after its passage through the respective vessel; and means for comparing the outputs of the photocells during a titration operation.

8. A titration absorptiometer having a pair of similar open-mouthed vessels with transparent bases shaped to the contour of the meniscus of a liquid therein; means for supporting each vessel with its axis normally vertical; means for focusing a steady beam of light vertically downwards so as to traverse the full length of each vessel; means for introducing a titrating liquid axially through the mouth of one vessel; two photocells mounted below the vessels for irradiation by the respective downward focused light beams; and means for continuously comparing the outputs of the photocells while titrating liquid is being added to the said one vessel.

9. A titration absorptiometer comprising a pair of normally vertically disposed cylindrical vessels having transparent bases shaped so that the depth of liquid in the vessel is proportional to its volume; a holder for each vessel mounted for rotation about an axis inclined to the vertical; agitating means including means for rotating the holder to swing the vessel away from its normally vertical position; and a return spring for restoring the holder to its normal position; an optical system for directing a steady downward light beam axially through each vessel from a point above the level of the mouth thereof; a titration reagent dispenser movable into a position vertically above the mouth of one of said vessels and adapted for introducing the titration reagent axially into the vessel without interrupting the passage of the light beam therethrough; a pair of photocells located beneath the vessels so as to be irradiated by the light beams after their passage through the full lengths of the vessels; and an electrical circuit for continuously comparing the outputs of the photocells during introduction of the titration reagent into the said one vessel.

10. A titration absorptiometer comprising a casing; a pair of vessels located side by side within the casing, each vessel having an open mouth and at least its bottom wall of transparent material, and said bottom wall being shaped to conform to the contour of the meniscus of a body of liquid therein; a bearing for supporting each vessel in a normally vertical position, the axis of rotation of the bearing being inclined to the vertical; agitating means for oscillating each vessel about said inclined axis; a light source; an optical system for directing a separate beam of light vertically down through each vessel from a point above the level of the mouth thereof; means for controlling the relative intensities of the two beams; a pair of photocells located beneath the vessels for irradiation by the said beams; means located above the mouth of one of the vessels for introducing a liquid reagent axially thereinto during passage of the light beams through the said vessels and without interrupting said beams; and means for continuously comparing the outputs of the two photocells during introduction of the said reagent.

References Cited in the file of this patent

UNITED STATES PATENTS

| | | |
|---|---|---|
| Re. 18,005 | Darrah | Mar. 24, 1931 |
| 1,648,369 | Svedberg et al. | Nov. 8, 1927 |
| 2,035,649 | Goudsmit et al. | Mar. 31, 1936 |
| 2,125,639 | Maass et al. | Aug. 2, 1938 |
| 2,254,062 | Devol | Aug. 26, 1941 |
| 2,269,674 | Liddel et al. | Jan. 13, 1942 |